UNITED STATES PATENT OFFICE.

JARED E. GAYLORD, OF BUTTE CITY, MONTANA.

PROCESS OF REDUCING COPPER MATTE.

SPECIFICATION forming part of Letters Patent No. 443,757, dated December 30, 1890.

Application filed June 21, 1890. Serial No. 356,281. (No specimens.)

*To all whom it may concern:*

Be it known that I, JARED E. GAYLORD, a citizen of the United States, residing in Butte City, in the county of Silver Bow and State of Montana, have invented an Improvement in Processes of Reducing Copper Matte, &c., of which the following is a specification.

This invention relates to the refining of copper ores or mattes, especially by what is known as the "Manhes process." In hearth or converter reduction or smelting of cupriferous ores or mattes containing iron sulphides or compounds it is necessary for the production of a suitable slag to furnish considerable silica as a flux to combine with the oxidized-iron compounds of the charge. I have discovered that quartzose or highly-silicious ores containing precious metals can be substituted for the ordinary ganister linings, silica linings, or silica additions heretofore employed in the smelting and refining of copper ores or mattes, with the double advantage of fluxing or slagging the oxidized iron of the charge and at the same time reducing and saving the precious metal contained in the silicious-ore lining or addition. To accomplish the result hereinbefore named, I preferably employ as a furnace-lining or as a flux addition an argentiferous ore containing not less than eighty-five per cent. of silica and preferably from ten to twenty ounces of silver, although it will be evident to any practical smelter that other highly-silicious ores containing gold or other precious metals could be substituted for the silver ore in carrying out my process.

In using this argentiferous or like silicious material as a lining for the refining or smelting furnaces or converters in which copper matte or ore is to be reduced I preferably mix the pulverized silicious ore with a small percentage of fire-clay or like aluminous material, or with lime or other base which will cause the silica of the ore to agglomerate at high temperatures, and I employ this mixture in a moistened condition, as usual in lining out furnaces with ganister, &c. For example, to newly line the metal shell of a Manhes converter for copper-refining I use about four tons of pulverized argentiferous quartz, each ton being preferably made up with about one hundred and seventy-five pounds of fire-clay or its equivalent in aluminous or basic binding material. This moistened mixture is rammed into the converter-shell with or without the use of a former, and the lining is subsequently dried, and before the charge of molten copper matte or ore is introduced it is well fired by means of a quantity of coke or other suitable fuel burned therein. A converter-lining of argentiferous ore thus prepared will last through twelve or fifteen separate smeltings or reductions, when it usually becomes too thin to safely withstand the scorifying action of the molten oxide of iron. I find that in these several operations as carried on in what is known as the "Manhes process" about two-thirds of the lining is fluxed and combined with the molten material of the several charges named. This reduction of the ore lining results, as above stated, in the fluxing of the iron of the copper charge and the production of a very fluid slag, which can be readily separated from the reduced copper, the precious metal of the lining or addition combining or alloying with the reduced copper, forming what may be well called a "copper bullion," which presents the several metals in a most desirable condition for electrolytic refining, by which operation the several metals are economically and efficiently separated in a merchantable condition. I find in an average of twelve operations, or during the life of an ore lining, that about five thousand pounds of the silicious lining have been smelted or reduced and the precious metal therefrom collected with the copper of the matte or ore, the quantity of precious metal thus obtained depending upon the richness and character of the ore used in the lining.

As a modification or variation of this process above described and to supplement the fluxing action of the silica of the ore lining, I sometimes introduce at the mouth of the converter, or by means of the tuyeres and blast, a quantity of the pulverized ore above mentioned, thus reducing the precious metal carried by said ore without interfering with the regular reducing or refining operation. In fact, as described in connection with the chemical action of the ore lining, it is evident that silicious ore thus injected with the air-blast or otherwise added to the charge will materially assist the fluxing and smelting process. In this way half a ton or more of silicious argentiferous ore may be smelted or reduced with the copper ores or mattes at each shift or series of converter operations, and the precious metal of the ore thus introduced will be found collected with the metallic copper.

Having thus described my invention, what I claim as new, and desire to secure by Letters Patent, is—

1. In reducing copper mattes, ores, &c., containing iron, the process of fluxing the iron and combining precious metal with the copper, which consists in subjecting the melted charge to the action of air-blasts and simultaneously supplying the molten charge with sufficient highly-silicious ore carrying precious metals to flux the iron, as described.

2. In reducing mattes, ores, &c., of copper which contains iron, the process of obtaining an alloy of copper and precious metal, which consists in lining out the refining vessels or chambers with a highly-silicious ore carrying precious metals and therein treating the melted charge in the usual manner described.

3. A lining composition for furnaces consisting of a highly-silicious ore carrying precious metal made up with refractory binding material, as described.

Signed by me this 19th day of June, 1890.

JARED E. GAYLORD.

Witnesses:
A. F. MIGEON,
LEMUEL W. SERRELL.